United States Patent
Hattori et al.

(10) Patent No.: US 7,793,285 B2
(45) Date of Patent: Sep. 7, 2010

(54) WEB INSTALLER DRIVER AND MANAGEMENT THROUGH A REMOTE NETWORK

(75) Inventors: Tomoki Hattori, Duluth, GA (US); Mitsugu Matsushita, Duluth, GA (US)

(73) Assignee: Ricoh Company, Ltd., Tokyo (JP)

( * ) Notice: Subject to any disclaimer, the term of this patent is extended or adjusted under 35 U.S.C. 154(b) by 1025 days.

(21) Appl. No.: 11/395,116

(22) Filed: Mar. 31, 2006

(65) Prior Publication Data

US 2007/0245358 A1   Oct. 18, 2007

(51) Int. Cl.
*G06F 9/445* (2006.01)
*G06F 9/44* (2006.01)

(52) U.S. Cl. .................. 717/174; 717/175; 709/203

(58) Field of Classification Search ......... 717/170–178; 709/203–204
See application file for complete search history.

(56) References Cited

U.S. PATENT DOCUMENTS

| | | | | |
|---|---|---|---|---|
| 6,009,274 A * | 12/1999 | Fletcher et al. | ............. | 717/173 |
| 6,598,223 B1 * | 7/2003 | Vrhel et al. | ................. | 717/174 |
| 6,668,376 B1 * | 12/2003 | Wang et al. | ................. | 717/178 |
| 6,671,749 B2 * | 12/2003 | Williams et al. | ............. | 710/10 |
| 6,751,794 B1 * | 6/2004 | McCaleb et al. | ............ | 717/168 |
| 6,754,896 B2 | 6/2004 | Mishra et al. | | |
| 6,775,829 B1 * | 8/2004 | Kroening | ................... | 717/175 |
| 6,820,259 B1 * | 11/2004 | Kawamata et al. | .......... | 717/173 |
| 6,915,337 B1 | 7/2005 | Motoyama et al. | | |
| 6,928,644 B1 * | 8/2005 | Kroening et al. | ............ | 717/175 |
| 6,957,437 B1 | 10/2005 | Bogia et al. | | |
| 6,959,437 B2 | 10/2005 | Schacht et al. | | |
| 6,965,931 B2 * | 11/2005 | Helms | ......................... | 709/223 |
| 6,967,734 B1 | 11/2005 | Wang et al. | | |
| 6,976,252 B2 | 12/2005 | White et al. | | |
| 7,047,528 B2 * | 5/2006 | Iida | ............................ | 717/170 |
| 7,190,467 B2 * | 3/2007 | Simpson et al. | .............. | 358/1.1 |
| 7,194,738 B2 * | 3/2007 | Lin et al. | ..................... | 717/174 |
| 7,251,812 B1 * | 7/2007 | Jhanwar et al. | ............. | 717/171 |
| 7,327,482 B2 * | 2/2008 | Ferlitsch | .................... | 358/1.15 |
| 7,353,373 B2 * | 4/2008 | Olbricht | ........................ | 713/1 |
| 7,430,736 B2 * | 9/2008 | Nguyen et al. | ............. | 717/176 |
| 7,440,130 B2 * | 10/2008 | Shima | ......................... | 358/1.15 |
| 7,461,375 B2 * | 12/2008 | Kazumi et al. | ............. | 717/176 |
| 7,478,381 B2 * | 1/2009 | Roberts et al. | ............. | 717/168 |
| 7,552,432 B2 * | 6/2009 | Aiba | .......................... | 717/177 |
| 2006/0221380 A1 | 10/2006 | Pretz et al. | | |
| 2007/0233834 A1 | 10/2007 | Hattori et al. | | |
| 2007/0234354 A1 | 10/2007 | Hattori | | |
| 2008/0235241 A1 | 9/2008 | Hattori et al. | | |
| 2009/0059272 A1 | 3/2009 | Matsushita et al. | | |

OTHER PUBLICATIONS

Dolstra et al, "Imposing a memory management discipline on software deployment", IEEE ICSE, pp. 585-592, 2004.*
Srikanth et al, "Software installation on a huge heterogenous network using mobile agents", IEEE ICIS, pp. 1049-1052, 2007.*
Han et al, "Secure multicast software delivery", IEEE, pp. 207-212, 2000.*
Treinen et al, "Expressing advanced user preferences in component installation", ACM IWOCE, pp. 31-40, 2009.*

* cited by examiner

*Primary Examiner*—Anil Khatri
(74) *Attorney, Agent, or Firm*—Cooper & Dunham LLP

(57) ABSTRACT

An improved system and method for installing a printer driver on a remote information terminal through a network are provided. A method for providing a network-based driver management service is also provided.

42 Claims, 7 Drawing Sheets

Fig. 1C
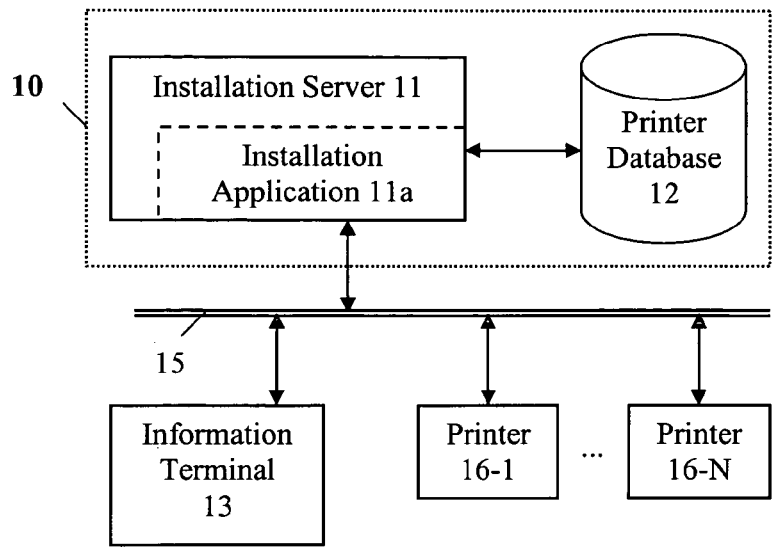
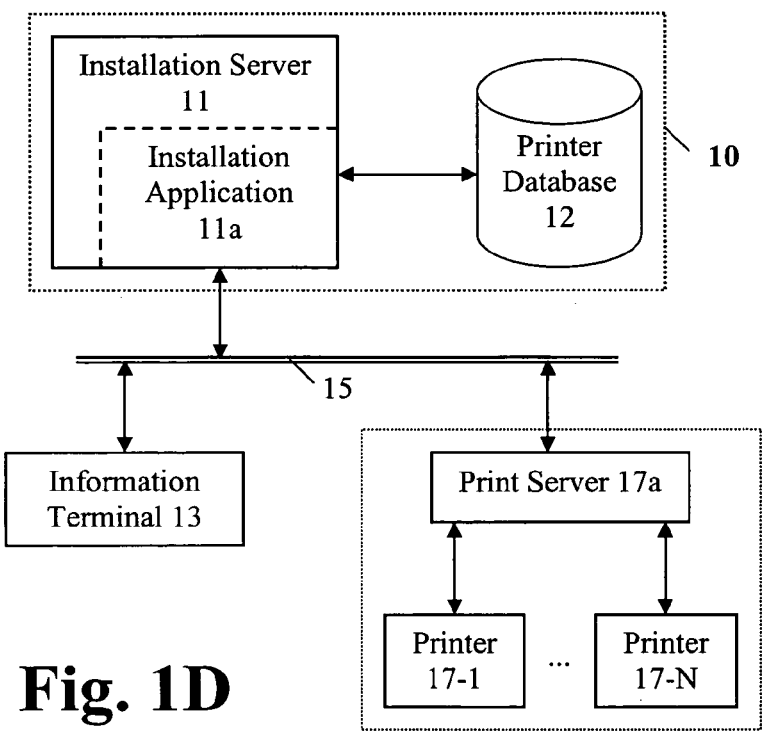
Fig. 1D

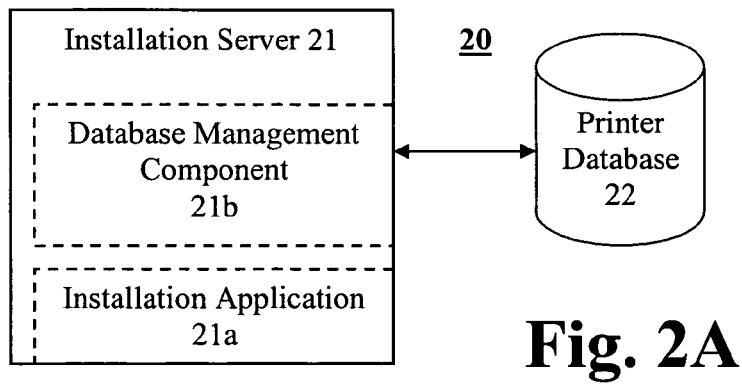
Fig. 2A
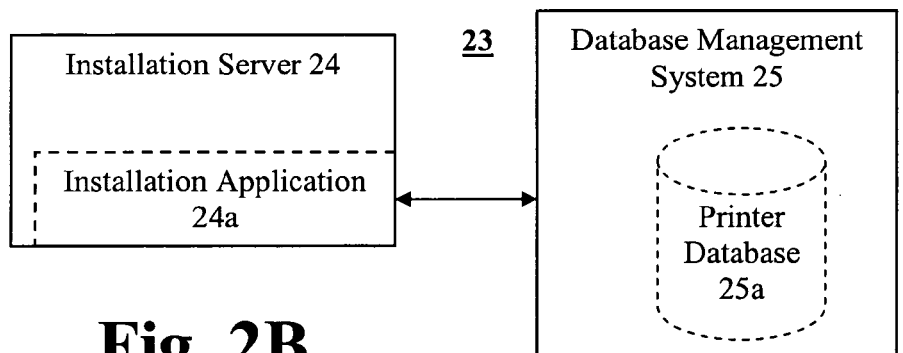
Fig. 2B
Fig. 2C
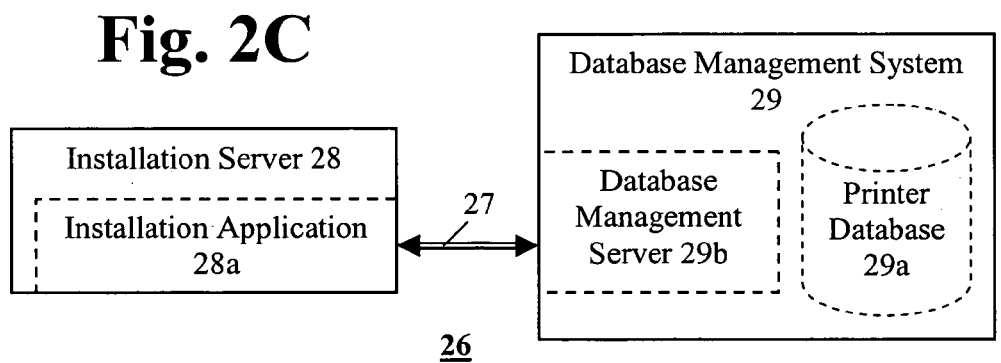

| Printer Name | Model Name | IP Address | Comment |
|---|---|---|---|
| ▶ | ▶ | ▶ | ▶ |

| State | City | Address | Building | Floor |
|---|---|---|---|---|
| ▶ | ▶ | ▶ | ▶ | ▶ |

| Submit | Reset |
|---|---|

| Installer | Uninstaller | PrinterName | ModelName | IP Address | Comment | State | City | Address | Building | Floor |
|---|---|---|---|---|---|---|---|---|---|---|
| install | uninstall | ... | ... | ... | ... | ... | ... | ... | ... | ... |
| install | uninstall | ... | ... | ... | ... | ... | ... | ... | ... | ... |
| install | uninstall | ... | ... | ... | ... | ... | ... | ... | ... | ... |
| ... | ... | | | | | | | | | |
| install | uninstall | ... | ... | ... | ... | ... | ... | ... | ... | ... |

Fig. 4

WEB INSTALLER DRIVER AND MANAGEMENT THROUGH A REMOTE NETWORK

TECHNICAL FIELD

This application relates to device drivers. In particular, the application relates to improved techniques for installing appropriate device driver software.

DESCRIPTION OF RELATED ART

Computer peripherals (such as printers, scanners, multi-function devices, modems, CD or DVD writers, network interface cards, display cards, external disk drives and the like) are becoming increasingly prevalent in computer systems used at home or at work. While some computer systems are initially configured with one or more peripheral devices, additional peripherals are typically added during the course of the lifetime of a computer system. Further, upgrades to the peripherals are often installed. In addition, some peripheral devices may be used as business office appliances (such as copiers, facsimiles, multi-function image processors, printers, image storage systems, etc.) connected to a network, and computers connected to the network may access the peripheral devices through the network.

A computer typically needs device driver software in order to communicate properly with a peripheral device. The driver generally provides a software interface that allows the operating system and software applications running on the computer to interface functionally with the peripheral. The driver software typically matches standardized commands from the computer's operating system to specific capabilities of the peripheral device.

Device driver software is typically stored on a floppy diskette or other portable storage medium packaged with a peripheral device, for installation by the user on a computer which will be communicating with the peripheral device. Different drivers are provided for different computer configurations (for example, different operating system versions may require different drivers). Additionally, for many peripheral devices different drivers are required to support different peripheral feature sets. Printers, for instance, may have one driver that supports a set of languages, and a different driver may be required for support of other languages. Likewise, if the user wishes to utilize a special math character set, a particular driver may be required.

Users of computers in the current computing environment in many instances seek the functionalities provided by peripherals which may be available to them. The set of such peripheral devices change over time because (as mentioned above) the peripherals change over time. In addition, the current trend is that more and more of the computers and other information terminals which can access the peripherals are mobile. Therefore, the location of a computer or information terminal which may seek the functionalities provided by peripheral devices can change location over time, and the set of available peripherals can change along with the change in location of the computer or information terminal.

Therefore, in many instances, a user is required to install additional device driver software. In such instances, the user may perform an improper operation in installing the device driver software, particularly if the device driver software includes device drivers for several different peripheral devices and/or if the user is required to make certain selections or settings during installation of the device driver software.

Packaging the device driver software with each peripheral device has the obvious drawback, from the vantage point of the manufacturer of the peripheral device, of increasing costs. Further, it often occurs that errors in device drivers are discovered or device drivers are updated after they have been shipped with peripheral devices. In that instance, the device driver software provided with the peripheral device may not be the most up-to-date version of the device driver or may contain minor flaws or bugs. In addition, newer drivers with additional functions may become available, and it is necessary to update the driver on each client computer to take full advantage of the functions added by the newer driver.

In the context of information technology (IT) management in an organizational setting (for example, in a corporation or other commercial enterprise, a governmental agency, other public or private organizations, etc.), administrators of the organizational IT system often encounter problems associated with finding and installing correct peripheral drivers. In such an environment, there may be a multiplicity of possible peripherals and associated drivers that will be required. Managing the large numbers of floppy diskettes and other storage media which store drivers for the peripheral devices that may be used in the IT system is a burdensome task.

In addition, suitable driver software can be obtained in some instances from any of a number of storage media in the organization's collection. While each of these storage media may have a different driver that will work with the peripheral device, some of these operable drivers may be old, obsolete versions that have unresolved bugs associated with them or that have only limited functionality. Additionally, the "best" driver may vary from one computer to the next (and sometimes, in the case of a shared computer, from one user to the next), depending on the computing environment and criteria for selection. By way of example, some users or computers may only use limited features on the peripheral. In such instances, it may be desirable to choose the driver that is easiest to obtain and install. Other users or computers may require advanced functionality and therefore the most recently released and robust driver version would be desirable regardless of the difficulty of obtaining and installing it. Therefore, the administrator may be confronted with the task of choosing a suitable driver from the plural drivers stored in the storage media, with little information readily available to distinguish the different drivers.

It has been proposed to provide "generic" peripheral drivers with operating systems. These generic drivers in theory can be used with a variety of different peripherals from different manufacturers. While these drivers may come prepackaged with the operating system and may be relatively easy to find and install, they can be problematic in practice. In order to make them usable with different peripheral devices, they typically provide only core functionality and may not support some features on a particular peripheral.

More recently, manufacturers have provided on-line access to device driver software. Typically, a manufacturer makes a "library" of device drivers available on the web site of the manufacturer, and a user can access the web site and download a desired driver. However, while a multiplicity of drivers may be available from the web site, they are not presented in a user-friendly way, such that the user can compare the multiple drivers and their respective function sets. The user is often required to investigate the functions of each driver by navigating to the page on the web site corresponding to the driver. Further, selecting appropriate device driver software may involve many interactive steps which open up the possibility of the user making errors in the process. Therefore, installation of the appropriate driver through the conventional Internet-based driver delivery system is time-consuming and difficult.

SUMMARY

This disclosure provides improved techniques for installing driver software for accessing a peripheral device from a remote information terminal through a network. In an example of a printer driver installation system, a printer database is maintained for storing printer information and corresponding printer driver information of a plurality of printers. An installation application (software) including a search tool is provided for searching the printer database for printer information of a printer matching a specified search key. Based on the driver information corresponding to the printer found in the search, a corresponding printer driver is downloaded and installed by the installation application applying a driver installer corresponding to the printer driver on the information terminal. Since the installation application is presented in a user friendly manner and format, a user, even one who is not a system administrator, and easily find the appropriate device driver and install the device driver on the information terminal.

Additional services can be provided, for example, as web services, for configuring and/or managing the driver installation system. A fee can be charged for such services, such as on a basis of workload of the configuration/management services, usage of the installation services or functionalities of the peripheral.

BRIEF DESCRIPTION OF THE DRAWINGS

The features of the present application can be more readily understood from the following detailed description with reference to the accompanying drawings wherein:

FIGS. 1A through 1D show block diagrams of respective systems for installing a printer driver on an information terminal through a network, according to some examples of the present disclosure;

FIGS. 2A through 2C show block diagrams of respective systems for installing a printer driver on an information terminal through a network, according to some additional examples of the present disclosure;

FIG. 4 shows a user interface window according to an example of the present disclosure;

DETAILED DESCRIPTION

Figure 1A:
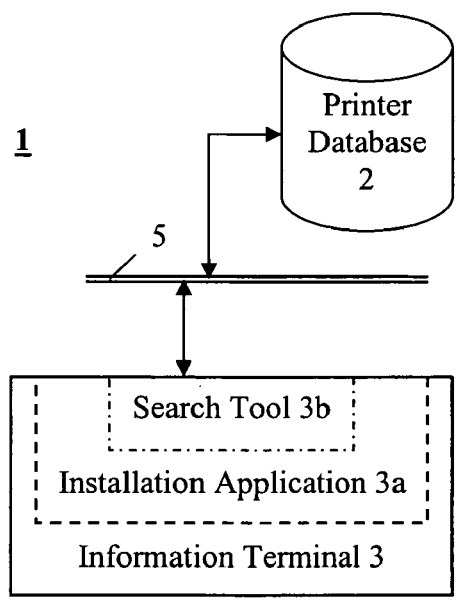

In describing preferred or exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

FIGS. 1A through 1D show examples of systems for installing a printer driver through a network connection.

System 1 shown in FIG. 1A includes a printer database 2 and an installation application 3a which resides natively on an information terminal 3 connected to the database 2 through network 5. The printer database 2 stores printer information for a plurality of printers, and for each printer the stored printer information includes driver information of one or more printer drivers (suitable for the printer) and corresponding installers. The printer database may be the central component of a database management system which is network-enabled. The network 5 may be one or a LAN (local area network), WAN (wide area network), the Internet, another type of network, or any combination thereof.

The installation application 3a includes a driver search tool 3b, and is configured to transmit a query through the network 5 to search for and find in the printer database 2 printer information of a printer matching a search key. Further, the installation application 3a utilizes the driver information corresponding to the printer to download a corresponding printer driver and driver installer to the information terminal 3 through the network 5, and apply the downloaded driver installer to install the printer driver on the information terminal.

The database may store the printer drivers and corresponding driver installers, or links or URLs (uniform resource locators) to the printer drivers and driver installers. In the case that the printer driver and corresponding installer are stored in the database, the printer driver and installer are retrieved from the database and downloaded to the information terminal, and the downloaded installer is executed to install the retrieved printer driver on the information terminal. On the other hand, if links or URLs to the printer driver and corresponding installer are stored in the database, the links or URLs are utilized to download the printer driver and installer to the information terminal, and the downloaded installer is executed to install the retrieved printer driver on the information terminal.

Figure 1B:
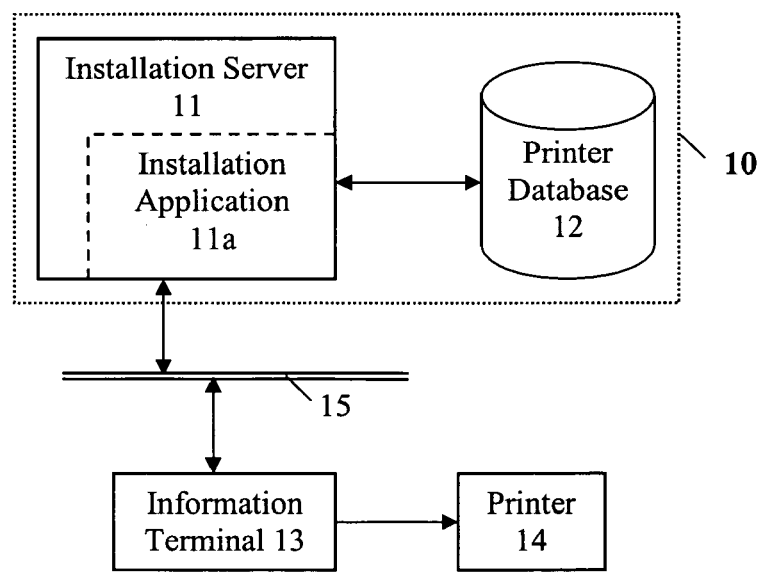

FIGS. 1B through 1D show different examples wherein the installation application is provided through a client-server configuration. System 10 includes an installation server 11 and a printer database 12. The printer database 12 stores printer information for a plurality of printers, including (but not limited to) corresponding printer drivers and printer driver installers. The server 11 provides an installation application 11a on demand from a remote client terminal 13 connected to the server through a network 15. As an example, the network 15 may include the Internet, and the installation application 11a may be provided by the server 11 as a web service to the remote information terminal through the network 15. As another example, the network 15 may include an Intranet, and the installation application 11a may be provided by the server 11 as a network service to the information terminal. In any event, the installation application 11a preferably includes a driver search tool (not shown) to search in the printer database 11b for a suitable printer. The printer may be, for example, local printer 14 (FIG. 1B), any of the network printers 16-1 to 16-N (FIG. 1C), or any of the printers 17-1 to 17-N in printer management system 17 (FIG. 1D).

The installation application and printer database may be adapted for any of various system configurations. In one example (FIG. 2A), the database may be specifically dedicated for printer management data and the installation application includes a database management component to access the database to store, update, search and delete (as well as perform other operations on) the printer information stored in the printer database. The database may include, for example, a collection of data files of a commonly known format, such as CSV (a simple file format that is often used to transfer data from one application to another application).

In another example (FIG. 2B), the printer data is managed by a commercially-available database management system (for example, Oracle, Ingres, another SQL server, etc.) which maintains the printer database. The installation application accesses the printer data by communicating with the database management system through an established protocol (for example, ODBC—Open DataBase Connectivity, a standard database access method), to perform operations (such as store, update, search, delete, etc.) on the data in the database.

A single server may perform the function of an installation server as well as the function of database management (for example, FIG. 2A). Alternatively, a separate server may be provided for database management (for example, FIG. 2C). The installation server may communicate with the database management server through a network.

Although the examples of FIGS. 1B and 1C show the systems in a client-server configuration, it should be appreciated that the installation application can be provided via another type of network-connected configuration (such as a peer-to-peer configuration). In any event, the use of client-server systems (and peer-to-peer systems) for delivery of applications is well-known, and therefore a detailed discussion is omitted in the interest of clarity and brevity.

Figure 3:
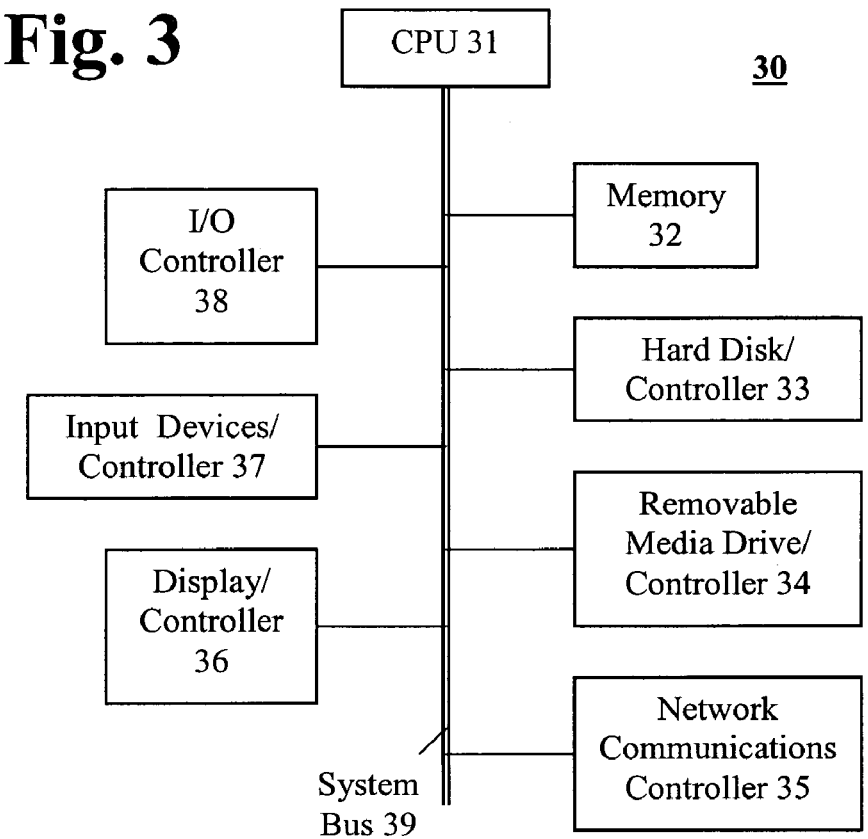
FIG. 3 shows a block diagram of an informational terminal.

An exemplary configuration of an information terminal is shown in FIG. 3. Information terminal 30 includes CPU 31, memory 32, hard disk (and controller) 33, network communications controller 35 (for communications through a wired or wireless network), display (and controller) 36, one or more input devices (and controller) 37, I/O controller and optional removable media drive (and controller) 34, all of which are connected through system bus 39. The information terminal can be any of the various conventional devices which have a need to print on demand, such as personal computers, notebook computers, workstations, other types of computers, PDAs, other information appliances, etc. The installation application may be installed on the information terminal via download through a network connection or via removable media (for example, floppy diskette, optical disc, other media, etc.). The information terminal can output print jobs via a network connection or through a local serial or parallel port.

Additional features of the installation application which may optionally be provided will now be discussed.

As discussed above, conventional driver installation systems typically assume that the user who will be installing the device driver is a system administrator and has an abundance of time to figure out the unwieldy approach of the conventional system for installing the driver provided by the system.

The installation application of this disclosure preferably includes an easy-to-use user interface which displays assorted printer information. The user may be provided with means for selecting a simple display with a few printer information fields or an advanced display with many more printer information fields.

In addition, a configuration tool (for example a pull-down menu) may be provided for customizing the printer information displayed by the user interface (for example, each field which the user wishes to display). As an example, the configuration tool may be used to customize the user interface to show, for each printer, whether the driver installer is to set the printer as the default printer (if the printer information in the printer database for a specified printer includes an indication that the printer is to be set as default printer, when the installer installs the corresponding printer driver on the information terminal, the printer is set to be the default printer for the information terminal). The user may save the setting such that the same setting can be applied in subsequent sessions of use of the installation application. The user interface setting may default to a user or group setting.

The user interface allows a user to specify a search key for the search. An example of a user interface window is shown in FIG. 4. The user specified key may be registered and retrieved at a later time. The search key may include one or more search terms for fields such as printer name, model name, IP address, additional printer device information (for example, such as color printing function entered in the Comment field in FIG. 4), location terms (for example, in the State, City, Address, Building, Floor fields), etc. The user may specify search terms by pull-down selection (for example, when the downward pointing button below the "State" field in FIG. 4 is pressed, a scrollable menu of states may be presented for selection by the user). The selection items are preferably organized hierarchically (for example, when Georgia is selected for the State field, the pull-down menu only presents cities in the state of Georgia). The driver search tool searches the printer database utilizing the user-specified search key and returns a list of matching printers and/or printer drivers. It should be apparent that pull-down and scrollable menus are mentioned above as examples of user interface features and that other well-known user interface features can be provided for entry of search terms.

As discussed above, mobile computers and information terminals can change locations readily, and the user may desire the use of peripherals from the new location. Therefore, a location function may be provided for obtaining location information of terminals. An information terminal might track its own location (for example, using a Global Positioning System card) and provide such location information. Alternatively, location information may be extrapolated from locations of routers, locations provided by wireless networks or other wireless technologies (such as RFID). The driver search tool may use the terminal location information to focus the search.

The user interface displays the list and corresponding printer information (which may be presented as a table), to allow the user to select (for example, by press an "install" button in FIG. 4) one of the printer drivers. Upon selection of a printer driver from the list, the installation application retrieves and downloads the selected printer driver and corresponding installer, and applies the retrieved installer to install the retrieved printer driver on the information terminal.

The installation application may further include an uninstall function. The uninstall function may be invoked through the user interface ("uninstall" buttons in FIG. 4). The installation application may be configured to perform the uninstall function automatically at a predetermined time after installation of the printer driver (so that use of the printer from the information terminal can be time-limited). Alternatively, the installation application may allow a user to specify at a time of installation of the printer driver whether to perform the uninstall function automatically (for example, the user may wish to limit the time duration because he or she will be using the printer for a limited time).

The driver configuration in some instances may be fixed (that is, the driver is installed with the same device options for each user). On the other hand, a function may be provided in the installation application to communicate with the printer for which the driver is to be installed on the information terminal to determine the device options of the printer (for example, finisher type), and then the device driver to be installed is configured according to such device options. For example, some printers may require user ID information for its authentication function, and therefore the user ID obtained for security purposes by the installation application may be inserted automatically in the device driver.

In another example, the installation application may allow the user to modify the driver configuration through the user interface, prior to installation of the printer driver. If no modifications are made through the user interface, the installer applies the default configuration. For example, the default configuration (for each printer or on a case-by-case basis) may provide for the specified printer to be set as the default printer for the information terminal, at a time of installation of the printer driver. Alternatively, the user may be prompted during the installation process whether to set the printer as the default printer.

In any event, the device configuration can of course be modified manually through the wizard that is typically provided by the operating system of the information terminal. However, such manual setting typically requires some insight regarding the configuration of the information terminal.

The device driver is stored as a named file on the information terminal. The installation application can have an auto-naming function. In some instances, the automatically generated name is already used by another file on the information terminal. The user interface can prompt the user whether to overwrite the existing file of the same name or rename the driver file to be installed.

The system may also include functionality for maintaining the printer database. For example, an import function is preferably provided for populating the database with an external data file (for example, CSV file, another standard format file, a customized data file, etc.), and an export function may be provided to allow, for example, archiving or backup of the printer information.

In addition, a database editing tool for customizing and/or editing the database may be provided. The tool is preferably web-enabled to allow an authorized user (for example, with administrator privileges) to modify the data remotely.

In view of the numerous potential threats to information technology security, the system may be configured with assorted security measures. For example, the installation application may require the user to enter login information, in order to determine whether the user has the required authorization to install the driver on the information terminal. The login information may be logged for security reasons as well as for accounting purposes (discussed infra).

In addition, the installation of applications and drivers on an information terminal may require administrator access rights. A number of workaround approaches may be taken to allow a user who does not have administrator privileges for the information terminal to install the printer driver on the information terminal. For example, the security information (for example, user ID and password) for the administrator privileges can be encrypted and embedded in the retrieved installer. As another example, the retrieved printer driver can be pushed onto the remote information terminal (such as by using Microsoft SMS).

The system may further include a database update function for updating printer information if settings of a printer change (for example, a printer has been removed from use, the location of the printer changed, etc.) and updating the drivers stored in the database automatically (such as when the printer manufacturer makes new driver information available). The update function may operate periodically. An additional function may be provided to maintain for each printer driver a log of terminals on which the driver was installed, and update each such terminal with the updated printer driver version (for example, by replacement, by patching, etc.). Alternatively, the update may be pushed to the terminal and installed at a later time (for example when the administrator, after notification of the update, manually installs the update). In addition, the database update function may be coupled to a discovery function which searches the network to obtain new printer information, and the printer database is updated with the new printer information. In addition, newly discovered printers may be registered in an active directory (such as in the example of FIG. 1D).

Figure 5A:
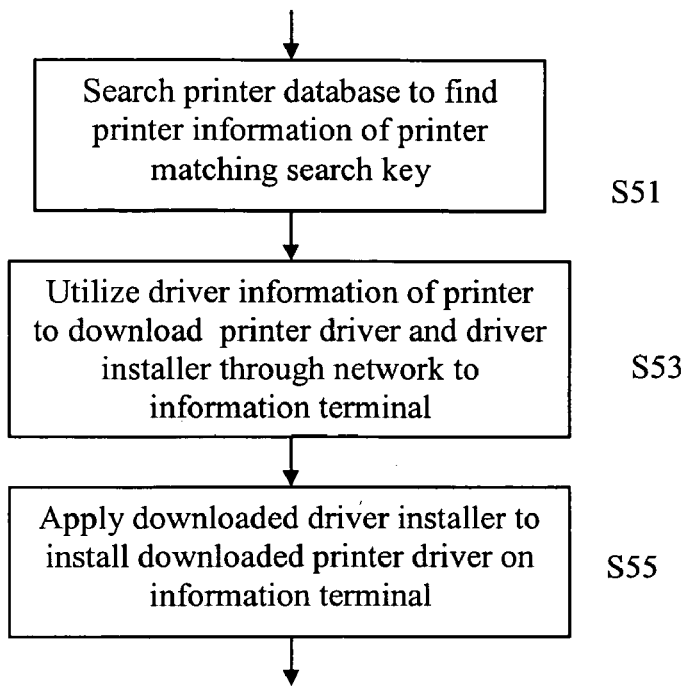
FIG. 5A shows a flow chart of a method for installing a printer driver on a remote information terminal through a network, according to an example of the present application.

A method for installing a printer driver on a remote information terminal through a network, in an example of the present disclosure (FIG. 5A), can comprise searching a printer database storing printer information for a plurality of printers, including for each printer, driver information of one or more printer drivers for the printer, and finding printer information of a printer matching a search key (step S51), utilizing the driver information corresponding to the printer to download a corresponding printer driver and driver installer through the network to the information terminal (step S53), and applying the downloaded driver installer to install the downloaded printer driver on the information terminal (step S55). The driver installer for the corresponding printer driver may be generated utilizing the driver information of the printer.

Figure 5B:
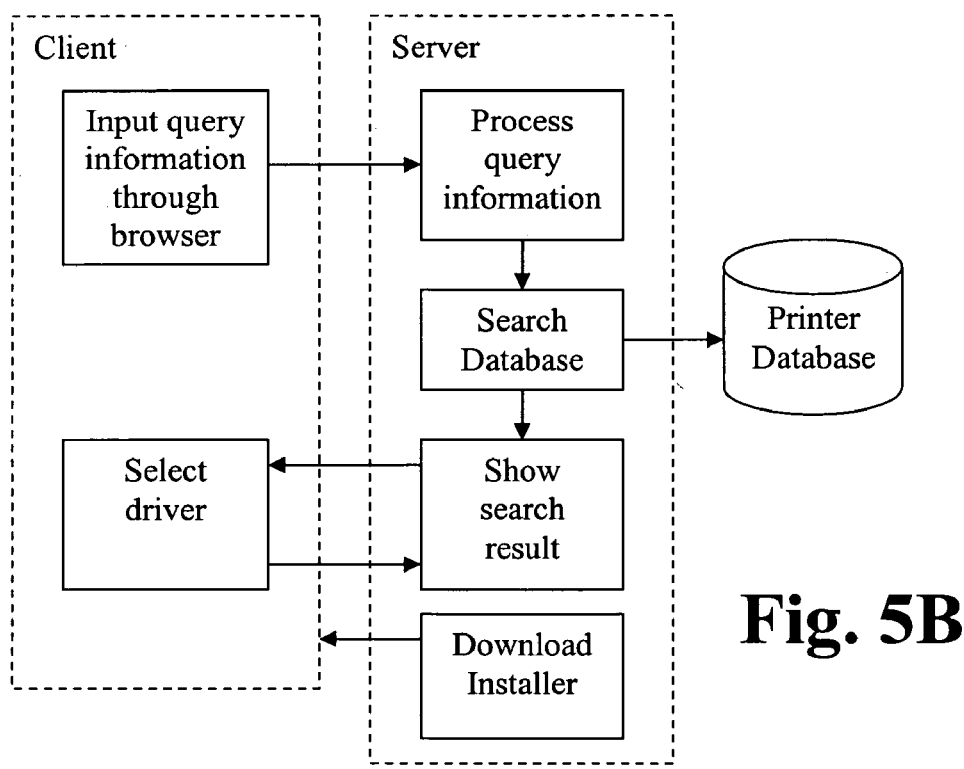
FIG. 5B shows a graphical representation of a work flow in the example of FIG. 5A.

An example of a workflow (FIG. 5B) will now be discussed. A user on a client computer opens a web browser and accesses a web page at a specified address (for example, http://web.server.address/web.installer.url/search.page). The user may be asked to enter login information. The user enters search keys for searching the printer database. The installation application formulates a query utilizing the search keys, and sends the query to the printer database to search the database. Based on results from the search, the installation application generates a web page utilizing conventional programming techniques, and the web page is transmitted to the client computer for viewing by the user. The user selects for installation a driver in the search results presented in the web page. The user may be requested to confirm that he or she wishes to proceed with installation of the selected driver. In this workflow, the relevant information is centralized and presented in a user-friendly manner which does not require the user to navigate through web pages at multiple disparate addresses.

Figure 6:
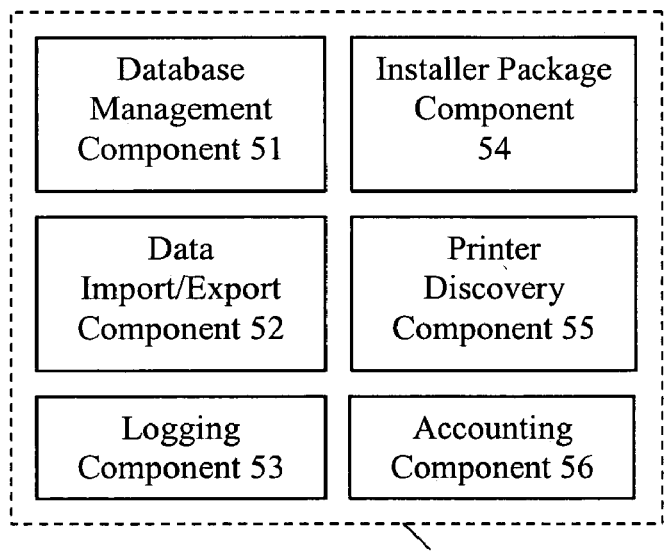
FIG. 6 shows a schematic representation of a web-based installation application, according to an example of the present disclosure.

Management of the printer driver installation system can be provided as a web service, and an example thereof will now be discussed with reference to FIG. 6.

A web service 60 can include a database management component 61, data import/export component 62, logging component 63, installer package component 64, printer discovery component 65 and an accounting component 66. The database management component 61 maintains data in the printer database, including deleting, searching and updating data in the database. In addition, the database management component 61 can, periodically or when necessary, connect to external databases to obtain updated data. The data import/export component 62 allows a user (for example, system administrator) to import a data file (for example, a CSV file) and save the data in the file to the database, and may also allow the user to export data from the database. The logging component 63 automatically logs activity on the system, such as change to the database, driver download, invocation of the installation application, invocation of configuration and management tools, etc. The installer package component 64, upon request, loads a printer driver configuration and creates an installer of the printer driver. The installer and driver information are packaged for download to the information terminal. The printer discovery component 65 searches the network for printers, using, for example, Simple Network Management Protocol (SNMP). The accounting component 66 tracks usage, workload, and other information which can be used to account for fees to charge to customers (discussed below). An additional component may optionally be included for communications with an external printer management system, such as by Lightweight Directory Access Protocol (LDAP) with the server of such a system, or to access an active directory.

Figure 7:
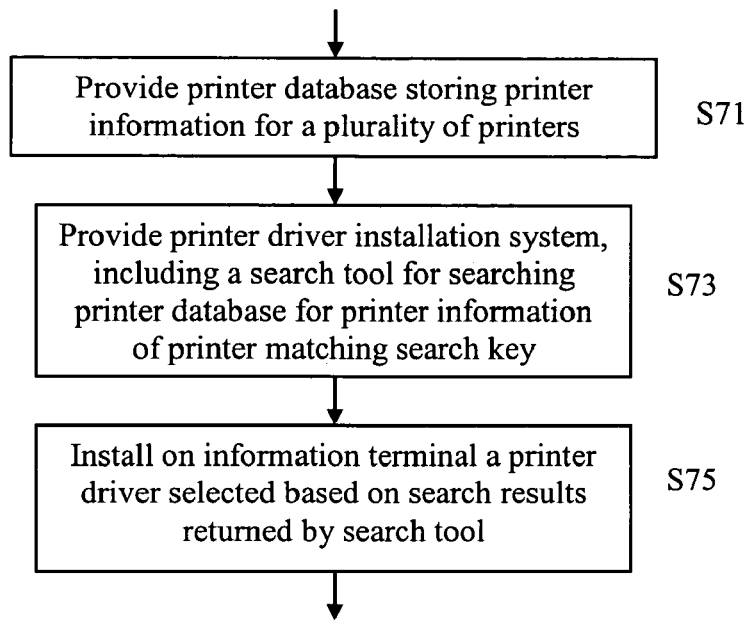
FIG. 7 shows a flow chart for a method for providing a network-based driver management service, according to an example of this disclosure.

A web service according to another example (FIG. 7) of the present disclosure will now be presented. A method for providing a network-based driver management service comprises (a) providing a printer database which stores printer information for a plurality of printers, including for each printer, one or more corresponding printer drivers (step S71), (b) providing a printer driver installation system, said system including a search tool for searching the printer database for printer driver information of a printer matching a search key (step S73), and (c) installing on a remote information terminal a printer driver selected based on search results returned by the search tool (step S75). The printer database provided preferably includes a printer information table having a plurality of columns for specifying printer information, printer driver and driver installer.

Figure 8:
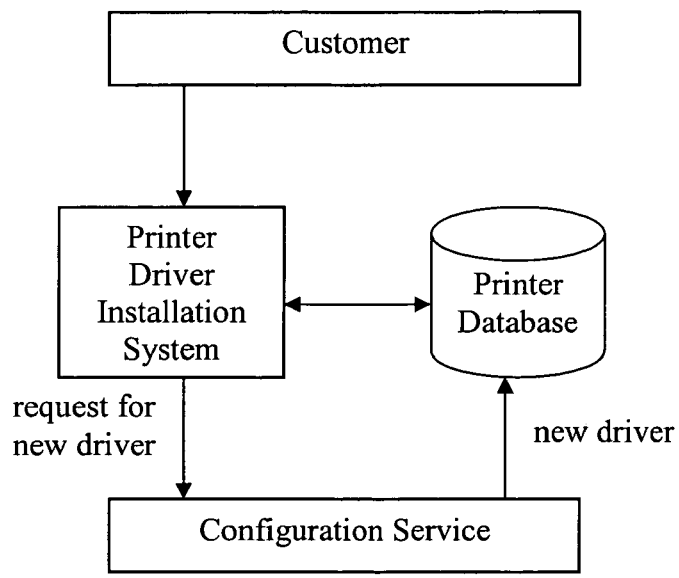
FIG. 8 shows a schematic representation of a system for installing a printer driver on an information terminal through a network adapted with a configuration service, according to an example of this disclosure.

Such a driver management service allows a user (or a system administrator) to configure the system remotely. In another example (FIG. 8), a user may use the printer driver installation system to specify a new driver, the new driver is then developed and added to the printer database by a configuration service, and then the user can access and manage the new driver.

A number of services may additionally be provided for configuring and/or managing the printer driver installation system, and a fee can be charged for such services. For example, services can be provided for registering and/or configuring a printer and/or for changing a printer configuration, and a fee can be charged for each registration, configuration or change. Thus, a fee can be charged according to workload of the services.

Further, users may be required to login in order to access the network-based driver management service, and the fee charged may be based on login information and/or (at least in part) on number of logins.

In addition, a fee can be charged based on number of downloads or based on usage of the installed driver. For example, as mentioned supra, a log of activity on the printer driver installation system can be maintained, and the log can include user and/or group ID information (for example, determined from login information) for each print job. Further, print jobs processed through the installed printer driver can be logged, and the print jobs processed through the printer driver may be determined, for example, by using the log. In addition, the printer driver can be configured specifically to account for a number of print jobs and/or pages printed.

Additional services may be provided. For example, a result of use may be monitored, and a recommendation of a printer to use may be provided based on an analysis of the monitored result. In addition, the services provided may be improved based on the monitored result. Further, as discussed above, the system may include components which monitor changes to printer information and available printer drivers. The services may include notifying a user of new printers and printer drivers or updated printer drivers.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

In addition, the term "printer" used herein, including in the appended claims, is used generically to include any output device having a printing or plotting functionality, and includes multi-function devices having a copy function and/or scanning in addition to the printing or plotting function.

Further, each of FIGS. 1A through 1C show a single information terminal as an example. However, it should be apparent that the system and the printer database can service a plurality of information terminal, and is preferably configured to be scalable.

In addition, the above-referenced examples and embodiments of this disclosure are discussed in an exemplary context of printer driver installation. However, it should be apparent that the subject matter of this disclosure is not limited to printer drivers and can be applied to driver installation for other peripheral devices.

What is claimed is:

1. A system for installing a printer driver on a remote information terminal through a network, said system comprising:
   a printer database storing printer information corresponding to a plurality of printers, the printer information including driver information for one or more printer drivers for each printer; and
   an installation application including a driver search tool to search in said printer database according to a search key and find a printer having corresponding printer information in the printer database including the search key,
   wherein the installation application utilizes selected driver information from the corresponding printer information to download a corresponding printer driver and driver installer,
   the installation application further includes a driver configuration function configured to obtain device options information through the network from said printer and to configure the printer driver according to the device options information, and
   the installation application applies the driver installer to install on the information terminal the printer driver configured according to the device options information, and
   wherein said installation application further includes an uninstall function that is automatically performed at a predetermined time after installation of the printer driver, and
   wherein said installation application allows a user to specify at a time of installation of the printer driver whether to perform the uninstall function automatically.

2. The system of claim 1, wherein said search key includes at least one of printer location, printer device information and color printing function.

3. The system of claim 1, wherein said installation application is provided by a server as a web service to the remote information terminal through the network.

4. The system of claim 1, wherein the printer found in the search is managed through a printer management system, and the installed printer driver allows the remote information terminal to print on the printer through the printer management system.

5. The system of claim 1, wherein the retrieved installer registers in an active directory the printer found in the search.

6. The system of claim 1, wherein said installation application further includes a user interface and supplies the user interface through the network to said remote information terminal, and the user interface allows a user to specify the search key.

7. The system of claim 6, wherein said driver search tool searches the printer database according to the user-specified search key and returns a list of matching printers and/or printer drivers, wherein the user interface displays the list and corresponding printer information, and wherein upon selection of a printer driver from the list, said installation application retrieves from said printer database the selected printer driver and an installer corresponding to the selected printer driver, and applies the retrieved installer to download and install the retrieved printer driver on the remote information terminal.

8. The system of claim 1, wherein said installation application further includes a user interface and allows the user to modify driver configuration through the user interface, at a time of installation of the printer driver.

9. The system of claim 7, further comprising a configuration tool for customizing the printer information displayed by the user interface with the list of matching printers and/or printer drivers.

10. The system of claim 7, wherein the user does not have administrator privileges for the remote information terminal, and the security information for the administrator privileges is embedded in the retrieved installer.

11. The system of claim 7, wherein the user does not have administrator privileges for the remote information terminal, and the retrieved printer driver is pushed onto the remote information terminal.

12. The system of claim 1, wherein said installation application automatically sets the printer found in the search to be the default printer for the remote information terminal, at a time of installation of the printer driver.

13. The system of claim 1, wherein if the printer information in the printer database for the printer found in the search includes an indication that the printer is to be set as default printer, said installation application sets the printer to be the default printer for the remote information terminal, at a time of installation of the printer driver.

14. The system of claim 1, further comprising a database editing tool for customizing and/or editing the database.

15. The system of claim 1, further comprising a database update function for searching the network to obtain new printer information and updating the printer database with the new printer information.

16. The system of claim 1, further comprising a database update function for updating the drivers stored in the database automatically.

17. The system of claim 1, further comprising a terminal location function for obtaining location information, wherein the printer information stored in the printer database includes printer location, and wherein the driver search tool uses the location information obtained by the terminal location function to focus the search.

18. The system of claim 1, wherein said printer database including a printer information table having a plurality of columns for specifying printer data, printer driver and printer driver installer.

19. The system of claim 1, wherein said installation application utilizes the selected driver information to generate said driver installer for said corresponding printer driver.

20. A web service for managing the system of claim 1 remotely through the network.

21. The web service of claim 20, wherein said web service includes a database management component, and said database management component maintains the printer data in said printer database.

22. The web service of claim 20, wherein a fee is charged for said service according to usage of the service.

23. The web service of claim 20, wherein a fee is charged for said service based on number of downloads, according to log information.

24. The web service of claim 20, wherein a fee is charged for said service according to workload of the service.

25. The web service of claim 20, wherein a fee is charged for said service based on number of logins.

26. The web service of claim 20, wherein fees charged for said service are based on number of print jobs processed through printer drivers downloaded from said printer database.

27. A method for installing a printer driver on an information terminal through a network, said method comprising:
    searching in a printer database storing printer information of a plurality of printers to find in said printer database a printer having corresponding printer information matching a specified search key, said corresponding printer information of the printer in said printer database including information of one or more corresponding printer drivers and driver installers;
    utilizing the printer information in the printer database to locate a corresponding printer driver, and downloading the printer driver and a corresponding driver installer through the network to the information terminal;
    providing an installation application including a driver configuration function configured to obtain device options information through the network from said printer and to configure the printer driver according to the device options information; and
    applying the downloaded driver installer to install the printer driver configured according to the device options information, on the information terminal,
    wherein said installation application further includes an uninstall function that is automatically performed at a predetermined time after installation of the printer driver, and
    wherein said installation application allows a user to specify at a time of installation of the printer driver whether to perform the uninstall function automatically.

28. A method for providing a network-based driver management service, said method comprising:
    providing a printer database storing information for a plurality of printers, said printer database including a printer information table storing for each of the printers, data specifying one or more corresponding printer drivers and driver installers;
    providing a printer driver installation system, said system including a search tool for searching the printer database for printer information matching a search key; and
    installing on a remote information terminal a printer driver corresponding to a printer selected based on search results returned by the search tool,
    wherein said printer driver installation system further includes a driver configuration function configured to obtain device options information through a network from a printer and to configure the printer driver according to the device options information, and the printer driver configured according to the device options information is installed on the remote information terminal, and wherein said installation application further includes an uninstall function that is automatically performed at a predetermined time after installation of the printer driver, and wherein said installation application allows a user to specify at a time of installation of the printer driver whether to perform the uninstall function automatically.

29. The method of claim 28, further comprising providing a configuration and management service for configuring and managing the printer driver installation system.

30. The method of claim 29, wherein said configuration and management service configures and manages the printer driver installation system remotely.

31. The method of claim 29, further comprising charging a fee according to workload of said configuration and management service.

32. The method of claim 29, further comprising charging a fee for using said configuration and management service to register and configure a printer.

33. The method of claim 29, further comprising charging a fee for using said configuration and management service to change a printer configuration.

34. The method of claim 28, further comprising charging a fee based on usage of said network-based driver management service.

35. The method of claim 28, further comprising:
maintaining a log of usage of said network-based driver management service; and
charging a fee based at least in part on number of downloads through said network-based driver management service, according to usage information in said log.

36. The method of claim 28, further comprising:
requiring a user to login in order to access said network-based driver management service; and
charging a fee based on login information.

37. The method of claim 28, further comprising charging a fee based on the number of print jobs processed through said printer driver installed through said network-based driver management service.

38. The method of claim 37, wherein said printer driver installed through said network-based driver management service is specifically configured to account for a number of pages printed.

39. The method of claim 28, further comprising:
maintaining a log of print jobs processed through said printer driver, said log including user information for each print job; and
charging a fee based on the number of print jobs processed through said printer driver, as determined by using the log.

40. The method of claim 28, further comprising:
monitoring a result of use of network-based driver management service; and
improving the network-based driver management service based on the monitored result.

41. The method of claim 28, further comprising:
recommending a printer to use based on an analysis of the monitored result.

42. The method of claim 28, further comprising:
recommending a printer driver to install based on an analysis of the monitored result.

* * * * *